(12) United States Patent
Cao et al.

(10) Patent No.: US 10,091,730 B2
(45) Date of Patent: Oct. 2, 2018

(54) ADAPTIVE MANAGEMENT OF WIRELESS CLIENTS BASED ON CLIENTS RADIO BEHAVIORS AND CAPABILITIES

(71) Applicant: Aruba Networks, Inc., Sunnyvale, CA (US)

(72) Inventors: Min Cao, Milpitas, CA (US); Partha Narasimhan, Saratoga, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/644,213

(22) Filed: Jul. 7, 2017

(65) Prior Publication Data

US 2017/0311259 A1   Oct. 26, 2017

Related U.S. Application Data

(63) Continuation of application No. 14/169,939, filed on Jan. 31, 2014, now Pat. No. 9,706,491.

(51) Int. Cl.
| | |
|---|---|
| *H04L 12/28* | (2006.01) |
| *H04W 52/02* | (2009.01) |
| *H04W 8/18* | (2009.01) |
| *H04W 64/00* | (2009.01) |
| *H04W 84/12* | (2009.01) |

(52) U.S. Cl.
CPC ......... *H04W 52/0219* (2013.01); *H04W 8/18* (2013.01); *H04W 52/0212* (2013.01); *H04W 64/00* (2013.01); *H04W 84/12* (2013.01); *Y02D 70/00* (2018.01); *Y02D 70/142* (2018.01)

(58) Field of Classification Search
CPC ...... Y02B 60/50; H04W 84/12; H04W 64/00; H04W 8/18; H04W 52/0219; H04W 52/0212
USPC .......... 370/235–310, 328–338; 455/432–453
See application file for complete search history.

(56) References Cited

U.S. PATENT DOCUMENTS

| | | | |
|---|---|---|---|
| 5,815,811 A * | 9/1998 | Pinard ................. | G06K 7/0008 375/132 |
| 6,393,261 B1 * | 5/2002 | Lewis ................... | H04W 92/02 370/338 |
| 7,173,918 B2 * | 2/2007 | Awater ................. | H04W 36/22 370/331 |
| 7,295,827 B2 | 11/2007 | Liu et al. | |
| 7,355,998 B2 | 4/2008 | Briancon et al. | |
| 7,433,669 B2 | 10/2008 | Rue | |

(Continued)

*Primary Examiner* — Man Phan
(74) *Attorney, Agent, or Firm* — Hewlett Packard Enterprise Patent Department

(57) ABSTRACT

The present disclosure discloses a method and network device for adaptive management of wireless clients based on clients' radio behaviors and capabilities. Specifically, a disclosed network device can dynamically select a location tracking mechanism based on a probing characteristic of a client device. The disclosed network device can also dynamically selects a communication mechanism based on a power saving characteristics of a client device. Moreover, the disclosed network device can determine whether to select a new access point for a client device based on roaming characteristics of the client device. The adaptive management of client devices can be performed on a group of client devices with similar radio behaviors and/or capabilities on a per-radio rather than per-BSSID (basic service set identifier) basis.

13 Claims, 8 Drawing Sheets

(56) References Cited

U.S. PATENT DOCUMENTS

| | | | |
|---|---|---|---|
| 7,509,129 B2* | 3/2009 | Sinivaara | H04L 47/125 370/329 |
| 7,885,217 B2 | 2/2011 | Iyer et al. | |
| 7,885,937 B2 | 2/2011 | Beadle et al. | |
| 7,996,236 B2* | 8/2011 | Awater | H04W 36/22 370/332 |
| 8,184,564 B2 | 5/2012 | Kinder et al. | |
| 8,335,937 B2 | 12/2012 | Qi et al. | |
| 8,379,556 B2 | 2/2013 | Choi et al. | |
| 8,724,603 B2 | 5/2014 | Barbu et al. | |
| 9,056,767 B2 | 6/2015 | Waters et al. | |
| 9,155,031 B2 | 10/2015 | Chai et al. | |
| 9,301,266 B2 | 3/2016 | Sampath et al. | |
| 9,686,718 B2* | 6/2017 | Sarawat | H04W 28/08 |
| 2011/0292925 A1 | 12/2011 | Ho et al. | |
| 2014/0064231 A1 | 3/2014 | Park et al. | |
| 2015/0094081 A1 | 4/2015 | Gupta | |
| 2016/0037439 A1 | 2/2016 | Shamis et al. | |
| 2016/0095071 A1 | 3/2016 | Henry et al. | |
| 2016/0095079 A1 | 3/2016 | Monajemi et al. | |
| 2016/0119862 A1 | 4/2016 | Rinne et al. | |
| 2017/0280337 A1* | 9/2017 | Bahr | H04W 24/02 |
| 2017/0295518 A1* | 10/2017 | Sarawat | H04W 28/08 |

* cited by examiner

ADAPTIVE MANAGEMENT OF WIRELESS CLIENTS BASED ON CLIENTS RADIO BEHAVIORS AND CAPABILITIES

PRIORITY APPLICATION INFORMATION

This application is a Continuation of U.S. patent application Ser. No. 14/169,939 filed on Jan. 31, 2014, which has been issued with U.S. Pat. No. 9,706,491 .The contents of which are incorporated herein by reference in its entirety.

FIELD

The present disclosure relates to management of wireless clients in a wireless local area network. In particular, the present disclosure relates to adaptive management of wireless clients in a wireless local area network based on the wireless clients' radio behaviors and capabilities.

BACKGROUND

Wireless digital networks, such as networks operating under the current Electrical and Electronics Engineers (IEEE) 802.11 standards, are spreading in their popularity and availability. In a wireless local area network (WLAN) deployment, a number of clients can be connected to the same wireless network via one or more access points. The number and type of smart phones, tablets, laptops and other clients that connect to WLANs continues to rise as new generations of clients hit the market. Such diverse clients with different operating systems and WLAN chipsets often result in a variety of connection speeds, roaming behaviors, band preferences, and other capabilities.

The ClientMatch™ technology from Aruba Networks© is able to match a client's capabilities to an optimal access point in a wireless network based on signal strength levels, loads of access points in the wireless network, etc., and to steer a client to the access point that will offer the best performance for the client.

Nevertheless, even with ClientMatch™ technology, different clients connecting to the same access point often have different radio behaviors and capabilities. For example, some clients may be legacy clients, whereas other clients may be compatible with IEEE 802.11ac standards. Some clients may have beamforming capabilities, whereas other clients may not have beamforming capabilities. Some clients may be enabled for power saving capabilities, whereas other clients may not be enabled for power saving capabilities. Therefore, it would be desirable to apply different service mechanisms to different groups of clients having different radio behaviors and/or capabilities.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to management of wireless clients in WLAN, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to management of wireless clients in a wireless local area network. In particular, the present disclosure relates to adaptive management of wireless clients in a wireless local area network based on the wireless clients' radio behaviors and capabilities.

With the solution provided herein, the disclosed network device monitors a client device based to determine a probing characteristic for the client device. The disclosed network device also selects a particular location tracking mechanism, of a plurality of location tracking mechanisms, based on the probing characteristic of the client device. Then, the disclosed network device uses the particular location tracking mechanism to determine a location of the client device.

In some embodiments, the disclosed network device determines a power saving characteristic of a client device, and selects a particular communication mechanism, of a plurality of communication mechanisms, based on the power saving characteristic of the client device. The disclosed network device can then use the particular communication mechanism to transmit data to the client device.

In some embodiments, the disclosed network device determines a roaming characteristic of a client device. Based on the roaming characteristic of the client device, the disclosed network device determines whether the client device is likely to roam under a particular circumstance. Responsive to determining that the client device is not likely to roam under the particular circumstance, the disclosed network device selects a particular access point, from a plurality of access points, by a network device for the client device. Responsive to determining that the client device is likely to roam under the particular circumstance, the disclosed network device allows the client device to select the particular access point, from the plurality of access points, for the client device.

Computing Environment

Figure 1:
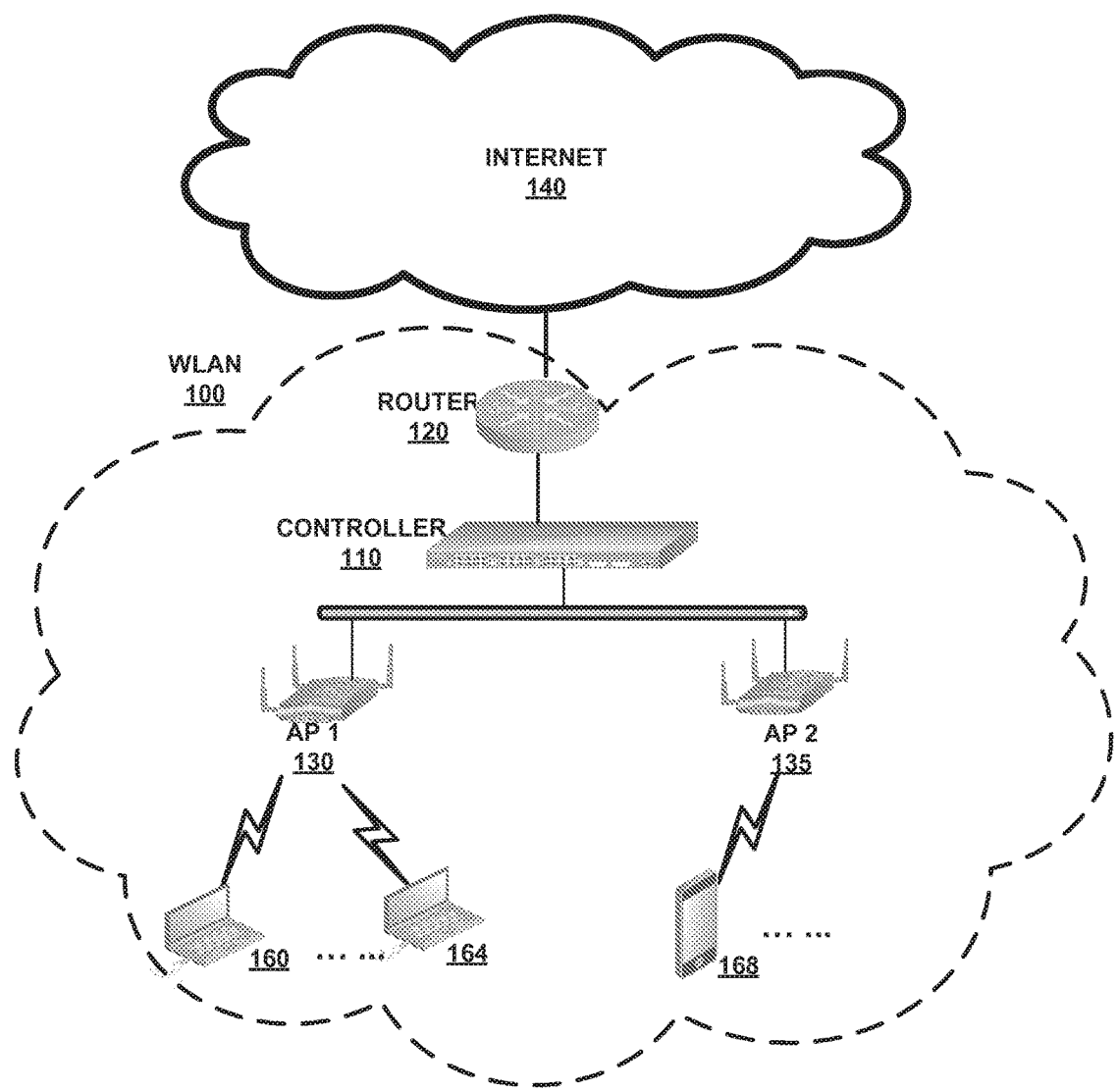
FIG. 1 is a diagram illustrating an exemplary wireless network environment according to embodiments of the present disclosure.

FIG. 1 shows an exemplary wireless digital network environment according to embodiments of the present disclosure. FIG. 1 includes a router 120 that connects a wireless local area network (WLAN) 100 and Internet 140. WLAN 100 includes a management network device, e.g., network controller 110, that connects a plurality of network devices, such as access point AP1 130, access point AP2 135, etc. through wired or wireless connections. Each network device is further connected with a plurality of client devices. For example, client devices 160-164 are associated with AP1 130; client device 168 is associated with AP2 135.

The network depicted in FIG. 1 may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network. The network control plane device may manage one or more network management devices, such as access points or network servers, within the sub-network.

Each client device may have different radio behaviors and/or capabilities. For example, some clients may be legacy clients, whereas other clients may be compatible with IEEE 802.11ac standards. Some clients may have beamforming capabilities, whereas other clients may not have beamforming capabilities. Some clients may be enabled for power saving capabilities, whereas other clients may not be enabled for power saving capabilities.

Network controller 110 can adaptively manage client devices 160-168 based on their different radio behaviors and/or capabilities. Network controller 110 can group client devices based on their radio behaviors and/or capabilities, select at least two different actions for two different devices connected to the same access point having the same basic service set identifier (BSSID). Note that, conventionally, client devices can be grouped into multiple groups; and, each group of clients can be assigned to an access point with a unique BSSID. However, the present disclosure allows for client devices to be assigned to a radio of an access point based on the client device's radio behaviors and/or capabilities, and thus allowing for client device management at a granular level.

Specifically, network controller 110 can dynamically select a location tracking mechanism based on a probing characteristic of a client device. Moreover, network controller 110 can dynamically select a communication mechanism based on power saving characteristics of client devices. Finally, network controller 110 can determine whether to select an access point for a client device based on roaming characteristics of the client device. These various adaptive client device management mechanisms are described in details in the following sections.

Figure 2A:
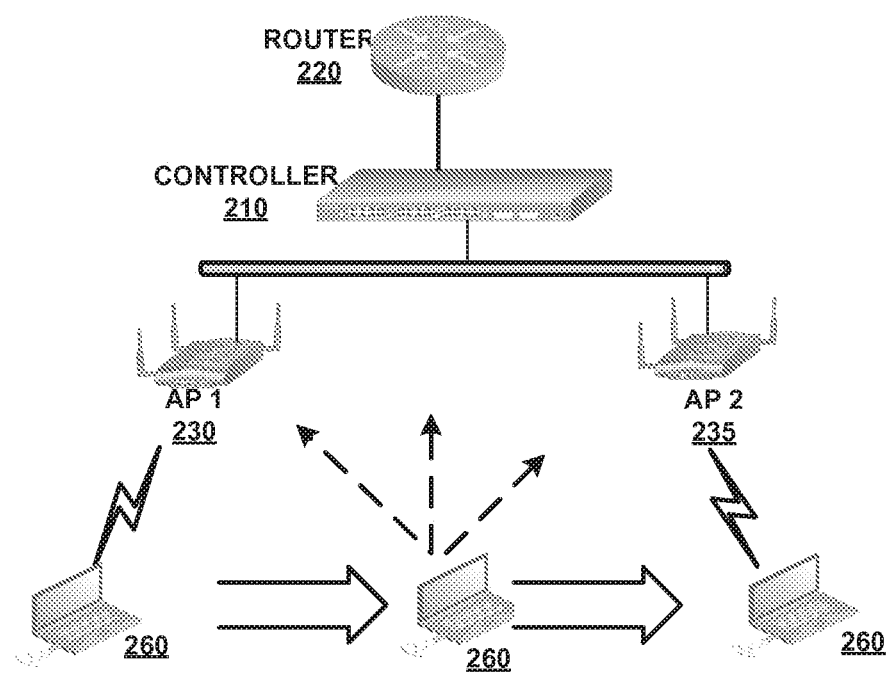
FIGS. 2A-2B are diagrams illustrating exemplary mechanism for adaptive management of wireless clients based on clients' radio behaviors and capabilities according to embodiments of the present disclosure.
Figure 2B:
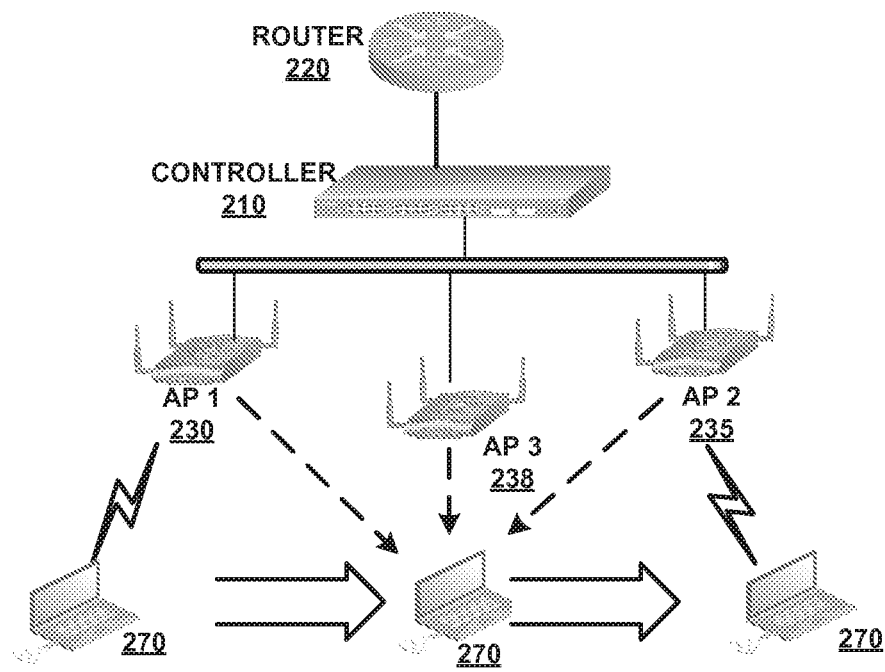

Dynamically Select a Location Tracking Mechanism Based on a Probing Characteristic of Client Device FIGS. 2A-2B are diagrams illustrating exemplary mechanism for adaptive management of wireless clients based on clients' radio behaviors and capabilities according to embodiments of the present disclosure.

Specifically, FIG. 2A includes a router 220, a network controller 210, and a number of access points, such as AP1 230 and AP2 235 that are managed by network controller 210. Client 260 is associated with AP1 230. AP1 230 monitors client device 260 to determine a probing characteristic for the client device. Different client devices can have different probing characteristics. For example, Android® devices typically enable probing capabilities, whereas Apple® devices do not. AP1 230 can select a particular location tracking mechanism based on the probing characteristic of client device 260.

Specifically, the probing characteristic for client device 260 may indicate that the client device transmits sufficient number of probe requests. Transmitting sufficient number of probe requests generally refers to: (a) the client device sends probe requests with a frequency above a particular threshold, and/or (b) the client device transmits probe requests when the client device is physically moving and the client device is not physically moving. As illustrated in FIG. 2A, when client device 260 transmits sufficient number of probe requests, AP1 230 can use the particular location tracking mechanism to determine a location of client device 260. The particular location tracking mechanism involves determining the location of the client device based on probe requests transmitted by the client device.

Alternatively, the probing characteristic for client device 260 may indicate that the client device does not send sufficient amount of probe requests as illustrated in FIG. 2B. FIG. 2B includes a router 220, a network controller 210, and a number of access points, such as AP1 230 and AP2 235 that are managed by network controller 210. Client 270 is associated with AP1 230.

Transmitting insufficient number of probe requests generally refers to: (a) the client device does not send probe requests with a frequency above a particular threshold, and; or (b) the client device does not transmit probe requests when the client device is not physically moving.

When client 270 transmits insufficient number of probe requests, the selected location tracking mechanism will transmit messages to client device 270. In some embodiments, the particular location tracking mechanism involves causing a plurality of network devices within the physical neighborhood, such as AP1 230, AP2 235, and AP3 238, to transmit messages to the client device around the same time. The APs can collaboratively send out a message, e.g., a NULL frame, and collaboratively listen to the response messages from the client device. This may require the nearby APs to switch off its operating channel to listen for and take measurements of the message from the client device. The particular location tracking mechanism causes client device 270 to transmit messages, e.g., in response to the messages transmitted to client device 270 by access points 230-238. The increased number of response messages from client device 270 allows for the network devices to determine accurate location of client device 270.

Figure 3:
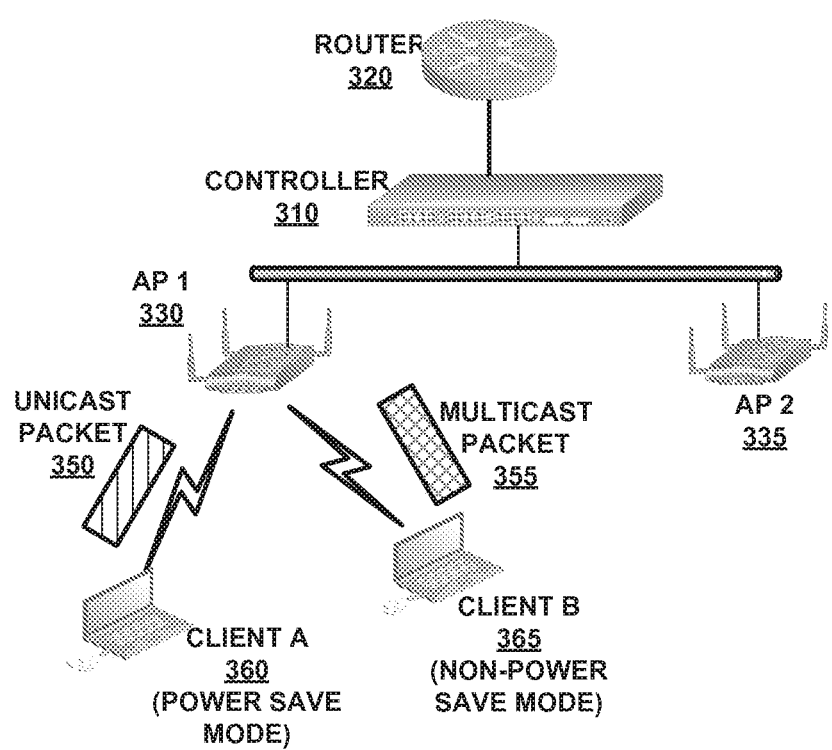
FIG. 3 illustrates another exemplary mechanism for adaptive management of wireless clients based on clients' radio behaviors and capabilities according to embodiments of the present disclosure.

Dynamically Select a Communication Mechanism Based on Power Saying Characteristics FIG. 3 illustrates another exemplary mechanism for adaptive management of wireless clients based on clients' radio behaviors and capabilities according to embodiments of the present disclosure. Specifically, FIG. 3 includes a router 320, a network controller 310, and a number of access points, such as AP1 330 and AP2 335 that are managed by network controller 310. A number of client devices are associated with each access point. For example, Client A 360 and Client B 365 are both associated with AP1 330. Different client devices may be in different power save mode while associated with the access points. As illustrated in FIG. 3, Client A 360 is in power save mode, whereas Client B 365 is not in power save mode.

According to embodiments of the present disclosure, AP1 330 can determine a power saving characteristic of client devices 360 and/or 365. AP1 330 can then select a particular communication mechanism, of a plurality of communication mechanisms, based on the power saving characteristic of the client device. The plurality of communication mechanisms may include a broadcast delivery mechanism, a multicast deliver mechanism, and/or a unicast delivery mechanism, etc.

AP1 330 then uses the particular communication mechanism to transmit data to client devices 360 and/or 365. For example, AP1 330 determines that client device 360 is currently in power save mode, and thus selects a unicast delivery mechanism to transmit unicast packets 350 to client device 360. On the other hand, AP1 330 determines that client device 365 is currently not in power save mode, and thus selects a multicast delivery mechanism to transmit multicast packets 355 to client device 365.

Furthermore, the power saving characteristic may indicate whether or not a power saving mode for the client device can be configured by a network device. For example, some client devices can allow a network device, such as an access point, to turn on or off its power save mode.

When the power saving characteristic indicates that the power saving mode for the client device can be configured by a network device, controller 310 and/or AP1 330 can select a multicast delivery mechanism for transmitting data to the client device, or a unicast delivery mechanism for transmitting data to client device 360 and/or client device 365. Specifically, when a first subset of client devices connected to an AP are in power save mode and a second subset of client devices connected to the AP are not in power save mode, the AP can transmit unicast packets to client devices in the second subset and only buffer packets for client devices in the first subset.

In addition, when the power saving characteristic indicates that a power saving mode for the client device can be configured by a network device, controller 310 and/or AP1 330 can add data redundancy information to the data transmitted to the client device. Alternatively, when the power saving characteristic indicates that the power saving mode for the client device can be configured by a network device, controller 310 and/or AP1 330 can refrain from adding data redundancy information to the data transmitted to the client device or removing the data redundancy information from the data transmitted to the client device. Because unicast packet delivery is generally more reliable than multicast packet delivery, AP1 may not need to add redundancy information to the unicast packets. However, when multicast packets are delivered to client devices, AP1 330 may need to add redundancy information to the multicast packets for improved reliability of delivery.

Figure 4:
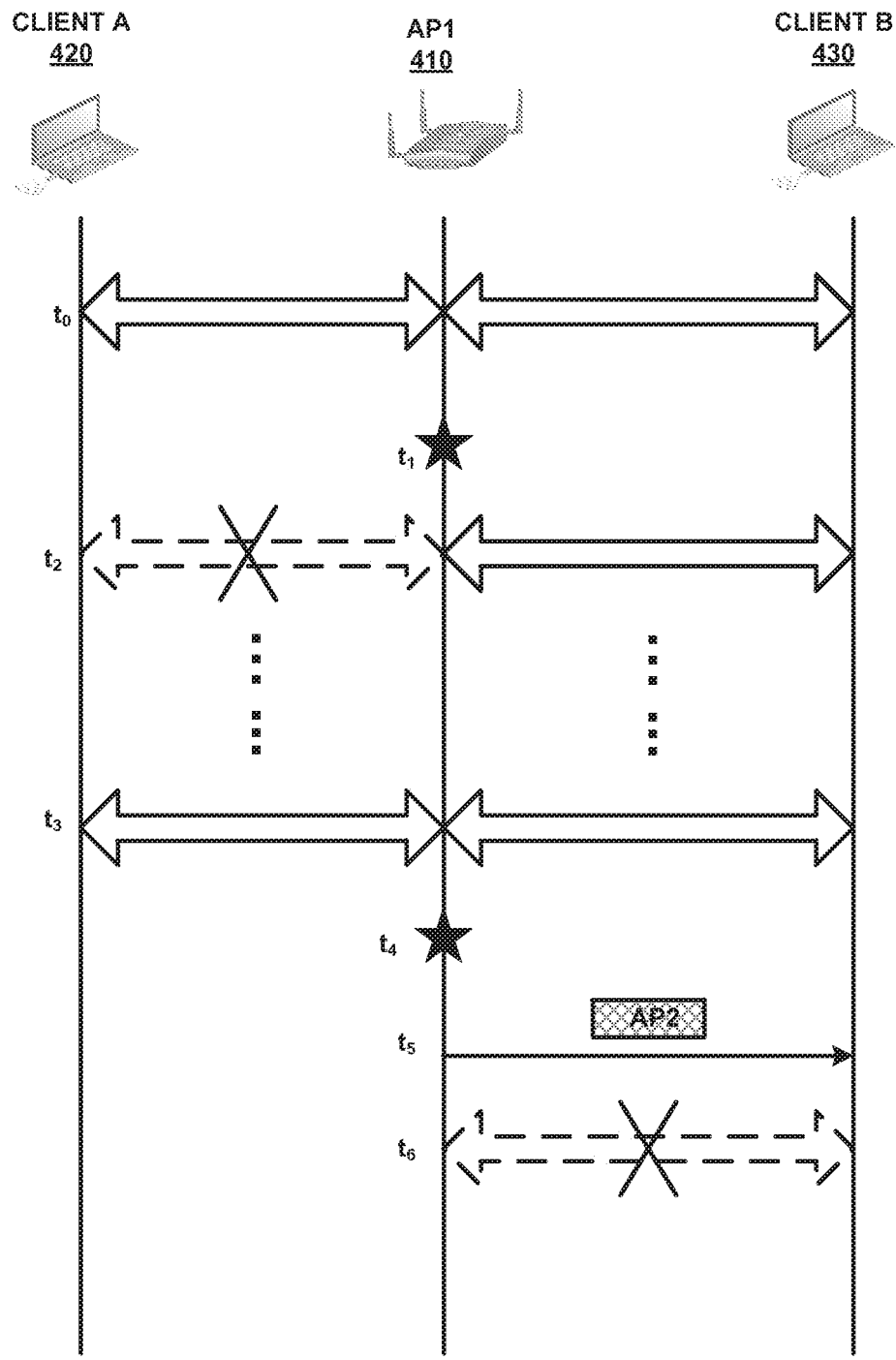
FIG. 4 is a sequence diagram illustrating an exemplary mechanism for adaptive management of wireless clients based on clients' radio behaviors and capabilities according to embodiments of the present disclosure.

Determine Whether to Select Access Point for a Client Device Based on Roaming Characteristics of the Client Device FIG. 4 is a sequence diagram illustrating an exemplary mechanism for adaptive management of wireless clients based on clients' radio behaviors and capabilities according to embodiments of the present disclosure. FIG. 4 includes AP1 410 and two client devices Client A 420 and Client B 430, both which are associated with AP1 410 at time point $t_0$ initially.

A network device, such as AP1 410 (or a network controller, not shown), can determine a roaming characteristic of a client device (e.g., Client A 420 and/or Client B 430). Based on the roaming characteristic of the client device, AP1 410 determines whether the client device is likely to roam under a particular circumstance. If AP1 410 determines that the client device is not likely to roam under the particular circumstance, AP1 410 or another network device can select a particular access point, from a plurality of access points, for the client device. On the other hand, if AP1 410 or another network device determines that the client device is likely to roam under the particular circumstance, AP1 410 or another network device can allow the client device to select the particular access point, from the plurality of access points, for the client device.

As illustrated in FIG. 4, at time point $t_1$, AP1 410 determines that Client A 420 is likely to roam. Moreover, AP1 410 may further determine that Client A 420 is likely to make a sound roaming decision, e.g., by selecting the best access point, based on its historical roaming decisions monitored and stored in the system. For example, the system can determine, each time when a client device roams from a first AP to a second AP, whether the second AP is a better AP for the client device to be connected to, and stores such historical roaming decisions. Thus, AP1 410 allows Client A 420 to select the access point to connect with by itself. As a result, at time point $t_2$, Client A 420 disassociates with AP1 410. Client A 420 may determine that AP1 410 is the best AP to connect and subsequently re-associates with AP1 410 at time point $t_3$.

In some embodiments, determining the roaming characteristic of Client A 420 involves determining whether or not the client device is likely to roam in response to a connectivity level with a current access point below a particular threshold.

In some embodiments, determining the roaming characteristic of Client A 420 involves determining whether or not the client device is likely to roam in response to a load of the current access point being above a particular threshold. Note that, the load of the current access point is advertised by the current access point in a load metric.

In some embodiments, determining the first roaming characteristic of Client A 420 involves determining whether or not the client device is likely to roam to a new access point in response to determining that a first connectivity level with the new access point is better than a second connectivity level with a current access point.

As another example, after an extended period of connection, AP1 410 determines at time point $t_4$ that Client B 420 is unlikely to roam to another AP. Therefore, AP1 410 selects a particular AP, e.g., AP2, for Client B 420 based on knowledge of network conditions.

In some embodiments, AP1 410 can select AP2 for Client B 430 by rejecting association request received from Client B 430. Moreover, another network device (e.g., network controller) can configure access points other than AP2 to reject an association process initiated by Client B 430.

In some embodiments, AP1 410 can select AP2 for Client B 430 by refraining from responding to probe requests transmitted by Client B 430. Moreover, another network device (e.g., network controller) can configure access points other than AP2 to refrain from responding to probe requests transmitted by Client B 430.

In some embodiments, AP1 410 can select AP2 for Client B 430 by transmitting a message, to the client device, at time point $t_5$, identifying a new access point (e.g., AP2) that Client B 430 is to connect to in order to access one or more network resources. Upon receiving the message, at time point $t_6$, Client B 430 disassociates with AP1 410.

In some embodiments, a network device monitors detects a radio behavior of a client device, and assigns the client device to a group based on the detected radio behavior. Subsequently, the network device can take an action based on the client device belonging to a particular group. The action may include, for example, gathering information by transmitting a message to a client device that does not transmit any probe messages to solicit a response from the client device.

Note that, selecting the particular access point for the client device by a network device or allowing the client device to select the particular access point is based on whether or not the client device is likely to roam under each of the plurality of circumstances. The plurality of circumstances include, but are not limited to, a connectivity level with a current access point drops below a particular threshold; a load of the current access point exceeds a particular threshold, whereas the load of the current access point is advertised by the current access point in a load metric; a first connectivity level with the new access point is better than a second connectivity level with a current access point; etc.

Figure 5A:
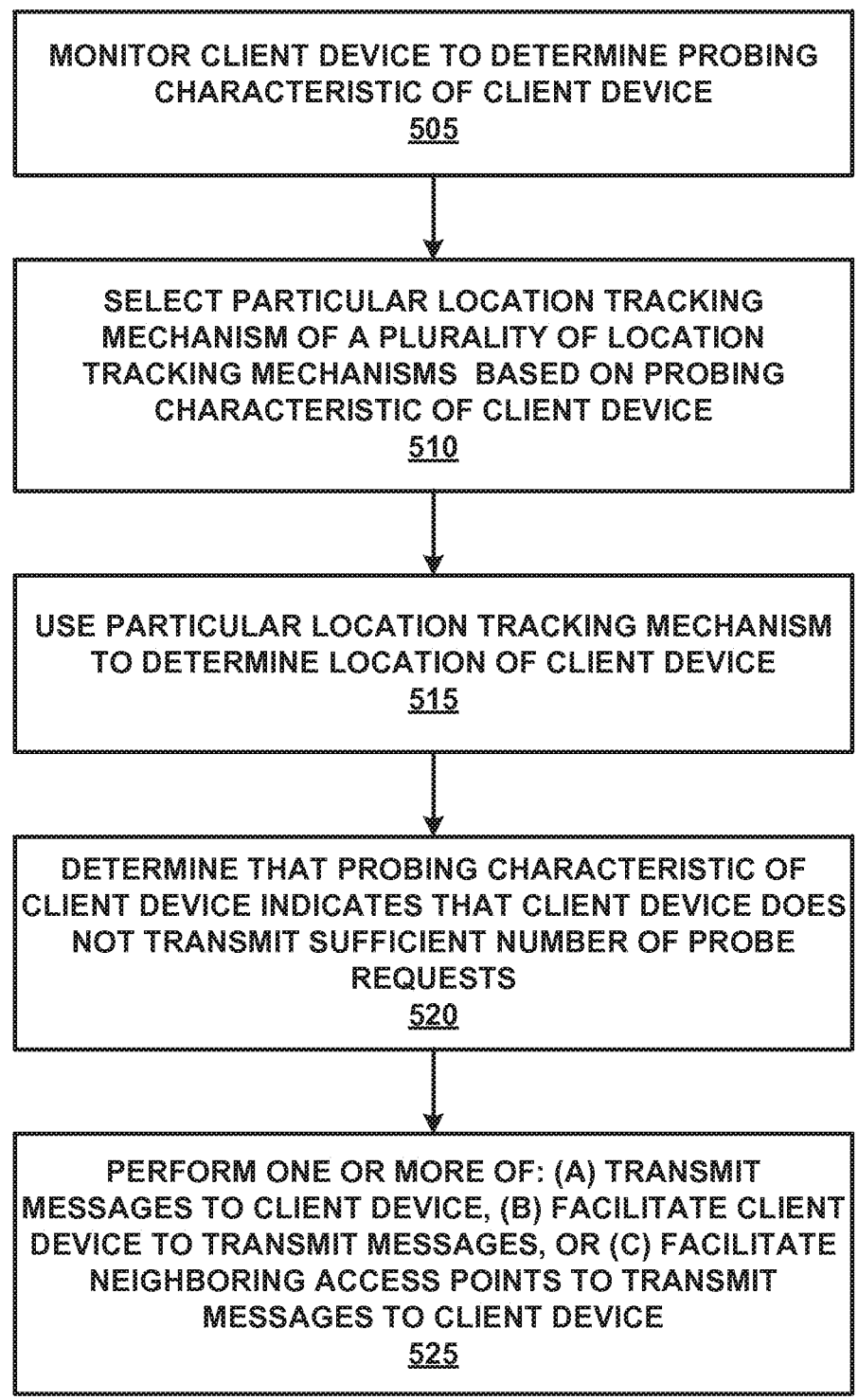
FIGS. 5A-5C illustrate exemplary processes for adaptive management of wireless clients based on clients' radio behaviors and capabilities according to embodiments of the present disclosure.
Figure 5B:
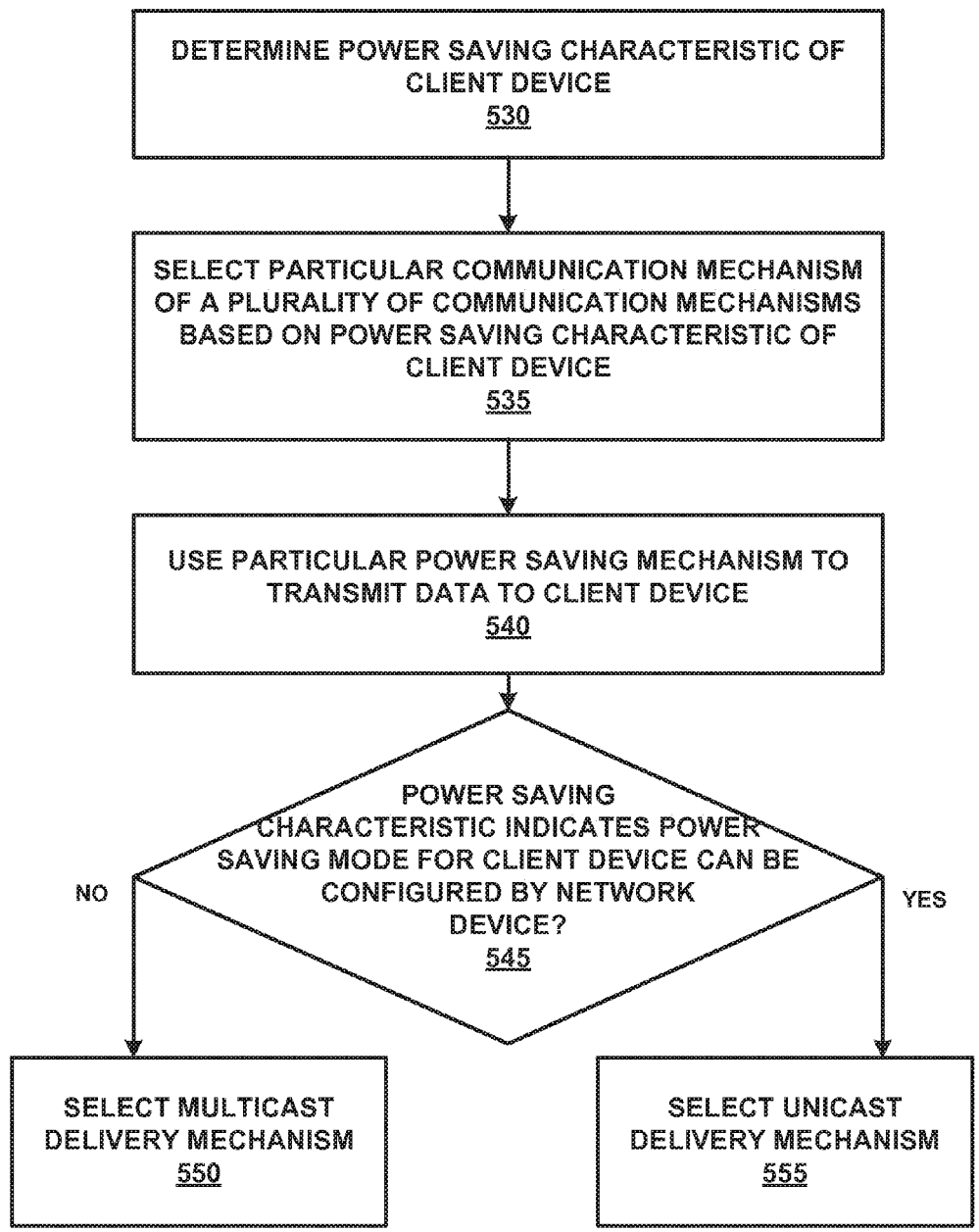
Figure 5C:
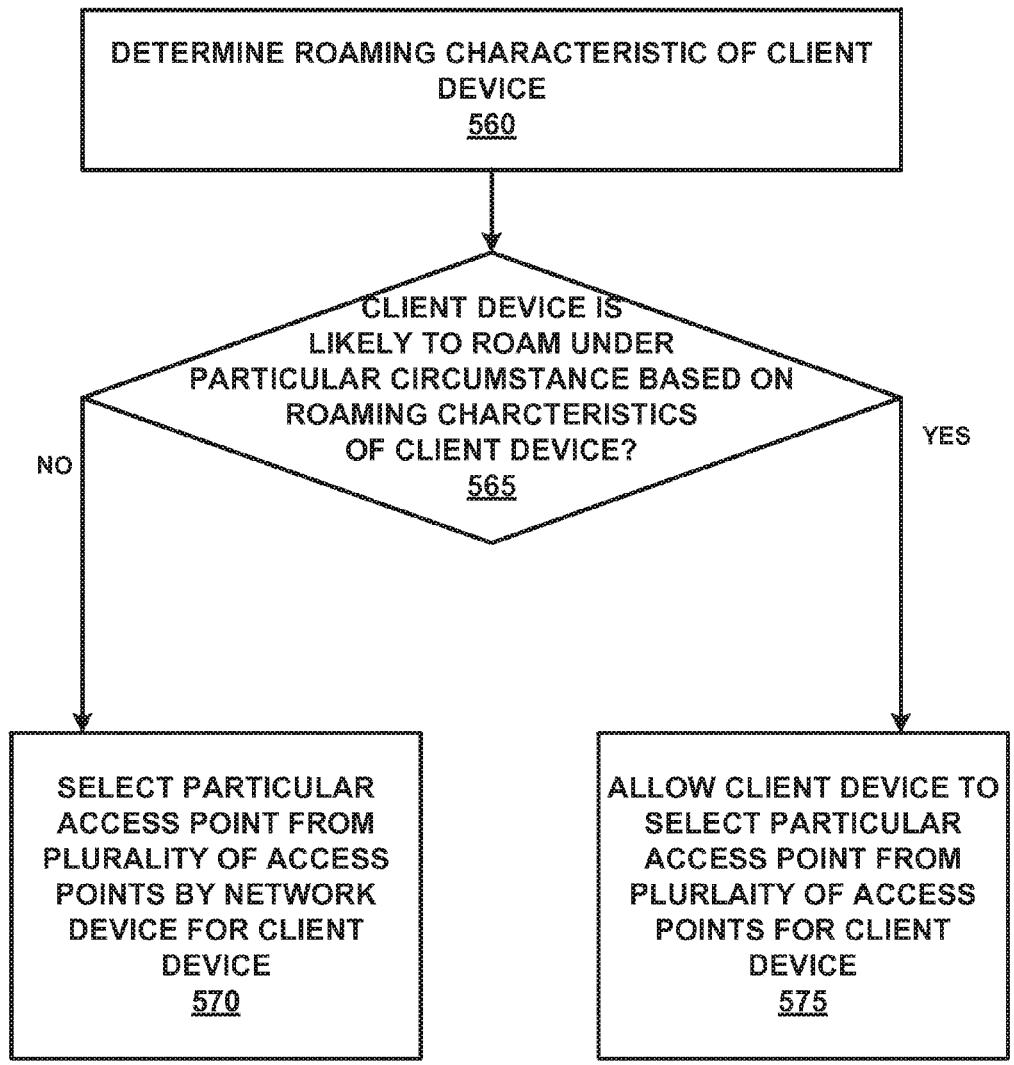

Process for Adaptive Management of Wireless Clients Based on Clients' Radio Behaviors and Capabilities FIGS. 5A-5C illustrate exemplary processes for adaptive management of wireless clients based on clients' radio behaviors and capabilities according to embodiments of the present disclosure.

Specifically, FIG. 5A illustrates a process for dynamically selecting a location tracking mechanism based on a probing characteristic of a client device. During operations, a network device monitors client device to determine probing characteristic of client device (operation 505). The network device selects a particular location tracking mechanism of a plurality of location tracking mechanisms based on a probing characteristic of the client device (operation 510). The network device then uses the particular location tracking mechanism to determine a location of the client device (operation 515). Further, the network device determines that the probing characteristic of the client device indicates that the client device does not transmit a sufficient number of probe requests (operation 520). Accordingly, the network device performs one or more of: (a) transmitting messages to the client device, (b) facilitating the client device to transmit messages, and/or (c) facilitating neighboring access points to transmit messages to the client device (operation 525).

FIG. 5B illustrates a process for dynamically selecting a communication mechanism based on power saving characteristics of client devices. During operations, a network device determines a power saving characteristic of a client device (operation 530). The network device selects a particular communication mechanism of a plurality of communication mechanisms based on the power saving characteristic of the client device (operation 535). The network device then uses the particular power saving mechanism to transmit data to the client device (operation 540). Furthermore, the network device can determine whether the power saving characteristic indicates that the power saving mode for the client device can be configured by the network device (operation 545). If so, the network device will select a unicast delivery mechanism to transmit packets to the client device (operation 555). Otherwise, the network device will select a multicast delivery mechanism transmit packets to the client device (operation 550).

FIG. 5C illustrates a process for determining whether to select an access point for a client device based on roaming characteristics of the client device. During operations, a network device determines a roaming characteristic of a client device (operation 560). The network device determines whether the client device is likely to roam under a particular circumstance based on roaming characteristics of the client device (operation 565). If so, the network device allows the client device to select a particular access point from a plurality of access points for the client device (operation 575). Otherwise, the network device selects a particular access point from a plurality of access points for the client device (operation 570).

Figure 6:
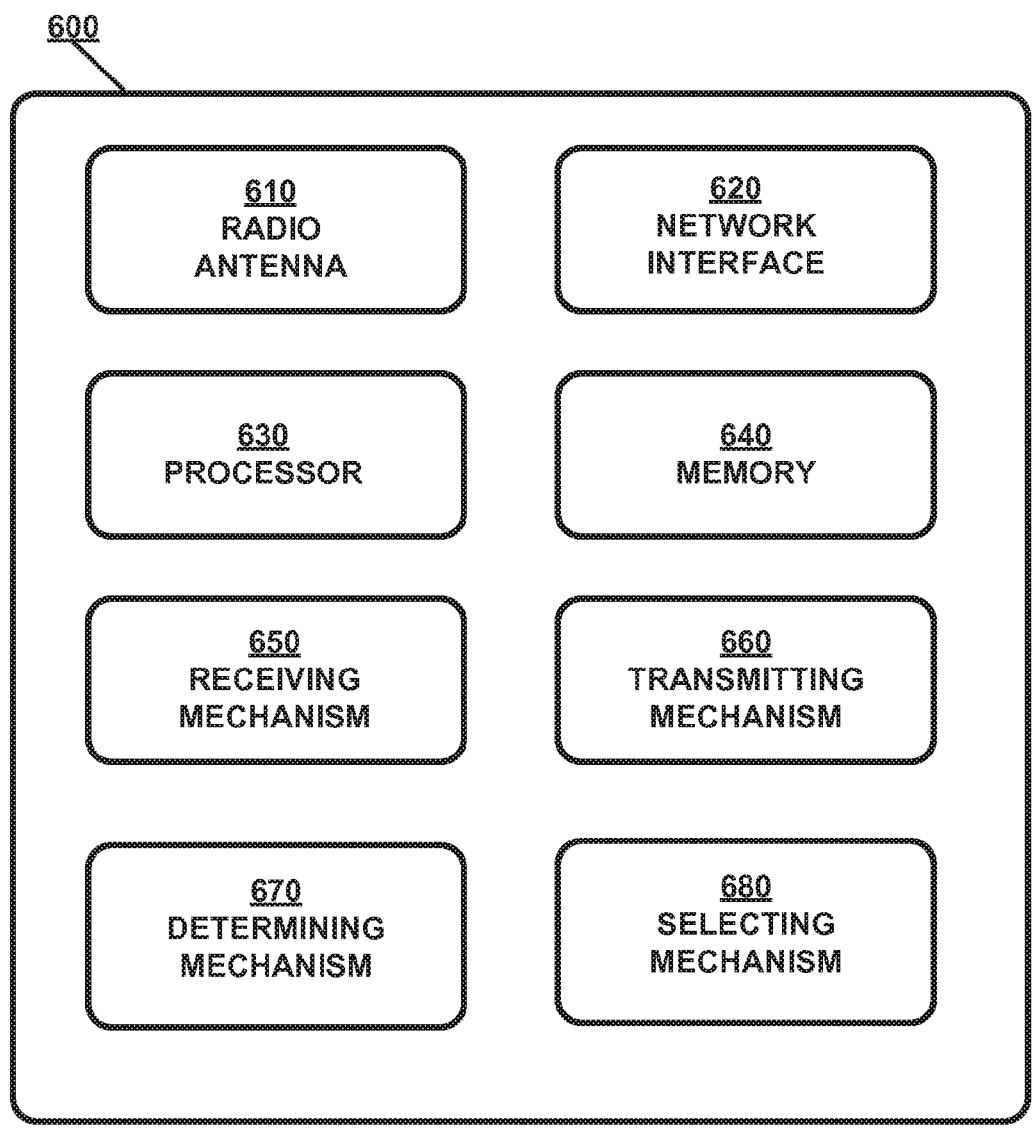
FIG. 6 illustrates a system for adaptive management of wireless clients based on clients' radio behaviors and capabilities according to embodiments of the present disclosure.

System for Adaptive Management of Wireless Clients Based on Clients' Radio Behaviors and Capabilities FIG. 6 illustrates a system for adaptive management of wireless clients based on clients' radio behaviors and capabilities according to embodiments of the present disclosure.

Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, determining mechanism 670, and selecting mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, requests and/or responses, beacon frames, management frames, control path frames, and so on. Each message may comprise one or more data packets, for example, in the form of IP packets.

Transmitting mechanism 660 generally transmits messages, which include, but are not limited to, requests and/or responses, beacon frames, management frames, control path frames, and so on. Specifically, transmitting mechanism 660 can use a particular communication mechanism selected based on a client device's power save characteristic to transmit data to the client device.

Determining mechanism 670 generally determines a location, a power save characteristic, and/or a roaming characteristic of a client device. Specifically, in some embodiments, determining mechanism 670 can use a particular location tracking mechanism to determine a location of the client device. The particular location tracking mechanism involves one or more of: transmitting messages to the client device, causing the client device to transmit messages, and/or causing a plurality of network devices to transmit messages to the client device. In some embodiments, determining mechanism 670 determines a power saving characteristic of a client device.

In some embodiments, determining mechanism 670 determines a roaming characteristic of a client device. Based on the roaming characteristic of the client device, determining mechanism 670 determines whether the client device is likely to roam under a under a plurality of circumstances. For example, determining mechanism 670 can determine whether or not the client device is likely to roam in response to a connectivity level with a current access point below a particular threshold. Also, determining mechanism 670 can determine whether or not the client device is likely to roam in response to a load of the current access point being above a particular threshold. The load of the current access point is advertised by the current access point in a load metric. Further, determining mechanism 670 can determine whether or not the client device is likely to roam to a new access point in response to determining that a first connectivity level with the new access point is better than a second connectivity level with a current access point.

Selecting mechanism 680 generally selects a particular location tracking mechanism, of a plurality of location tracking mechanisms, based on the probing characteristic of the client device. The probing characteristic can be determined by determining mechanism 670 from monitoring the client device.

In some embodiments, the probing characteristic for the client device indicates that the client device transmits sufficient amount of probes. In some embodiments, the probing characteristic for the client device indicates that the client device does not send sufficient amount of probe requests.

In some embodiments, the particular location tracking mechanism involves determining the location of the client device based on probe requests transmitted by the client device.

In some embodiments, selecting mechanism 680 selects a particular communication mechanism, of a plurality of communication mechanisms, based on the power saving characteristic of the client device. The power saving characteristic may indicate whether or not a power saving mode for the client device can be configured by a network device, for example, according to IEEE 802.11v standard.

When the power saving characteristic indicates that the power saving mode for the client device can be configured by network device 600. Selecting mechanism 680 configures the client device not to be in power saving mode and selects a multicast delivery mechanism for transmitting data to the client device. Moreover, transmitting mechanism 660 adds data redundancy information to the data transmitted to the client device.

When the power saving characteristic indicates that a power saving mode for the client device cannot be configured by a network device, and the client device is in power saving mode, selecting mechanism 680 selects a unicast delivery mechanism for transmitting data to the client device.

When the power saving characteristic indicates that a power saving mode for the client device can be configured by a network device, transmitting mechanism 660 refrains from adding data redundancy information to the data transmitted to the client device or removing the data redundancy information from the data transmitted to the client device.

In response to determining that the client device is not likely to roam under the particular circumstance, selecting mechanism 680 selects a particular access point, from a plurality of access points, by a network device for the client device. On the other hand, in response to determining that the client device is likely to roam under the particular circumstance, selecting mechanism 680 allows the client device to select the particular access point, from the plurality of access points, for the client device.

Selecting the particular access point for the client device by a network device or allowing the client device to select the particular access point is based on whether or not the client device is likely to roam under each of the plurality of circumstances. Furthermore, selecting mechanism 680 can configure at least one other access point to reject an association process initiated by the client device. Selecting mechanism 680 also can configure at least one other access point to refrain from responding to probe requests transmitted by the first client device. In addition, transmitting mechanism 660 can transmit a message, to the client device, identifying a new access point that the client device is to connect to in order to access one or more network resources, thereby guiding the client device to select the new access point to connect to.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions executable by a processor to:
    determine a roaming characteristic of a client device;
    determine a likelihood of the client device to roam under a particular circumstance;
    refrain from selecting an access point for the client device in response to a determination that the client device is likely to roam under the particular circumstance; and
    determine a characteristic of a previous selection of an access point by the client device, wherein the characteristic is an increase in a level of connectivity to the access point; and
    permit the client device to select an access point.

2. The non-transitory computer readable medium of claim 1, further comprising instructions to select an access point for the client device in response to a determination that the client device is unlikely to roam under the particular circumstance.

3. The non-transitory computer readable medium of claim 1, wherein the instructions to determine a likelihood of the client device to roam under a particular circumstance include instructions to:
    determine a first level of connectivity of the client device with a first access point;
    determine a second connectivity of the client device with a second access point; and
    determine that the first level of connectivity of the client device with the first access point is greater than the second level of connectivity of the client device with the second access point.

4. The non-transitory computer readable medium of claim 1, wherein the instructions to determine a roaming characteristic of a client device include instructions to determine a likelihood of the client device to roam in response to a determination that a load of the access point to which the client device is connected is above a threshold load.

5. A method, comprising:
    determining a connection of a client device with a first access point;
    determining a roaming characteristic of the client device;
    determining that the client device is unlikely to roam based on the determined roaming characteristic of the client device and a particular circumstance;
    selecting a second access point for the client device in response to the determination that the client device is unlikely to roam under the particular circumstance;
    determining a historical roaming decision of the client device, wherein;
        the historical roaming decision indicates a gain in connectivity between the client device and a previous access point, and
        the historical roaming decision is stored on the client device; and
    determining, based on the historical roaming decision of the client device, that the client device is to select the second access point to roam to.

6. The method of claim 5, further comprising transmitting an identification message to the client device, wherein the identification message identifies the second access point as the access point to which the client device is to connect.

7. The method of claim 6, further comprising:
    disassociating the client device with the first access point in response to transmission of the identification message to the client device; and
    associating the client device with the second access point.

8. The method of claim 5, wherein selecting a second access point for the client device further comprises configuring a third access point to reject an association request from the client device.

9. The method of claim 5, wherein selecting a second access point for the client device further comprises:
    determining a first load of the first access point;
    determining a second load of the second access point; and
    determining that the second load of the second access point is lesser than the first load of the first access point.

10. A system, comprising:
    a client device;
    a first access point coupled to the client device, the first access point to:

determine a roaming characteristic of the client device;
determine that the client device is likely to roam based on the determined roaming characteristic of the client device;
select a second access point in response to the determination that the client device is likely to roam;
determine a historical roaming decision of the client device, wherein:
 the historical roaming decision indicates a gain in connectivity between the client device and a previous access point, and
 the historical roaming decision is stored on the client device; and
determine, based on the historical roaming decision of the client device, that the client device is to select the second access point to roam to.

11. The system of claim 10, further comprising the first access point to disassociate with the client device in response to a selection of a second access point by the client device.

12. The system of claim 10, wherein to determine a roaming characteristic of the client device, the first access point is to:
 determine a load of the first access point;
 determine that the load of the first access point is above a threshold load; and
 determine that the client device previously roamed when a load of a previous access point to which the client device was connected was above the threshold load.

13. The system of claim 10, wherein to determine that the client device is likely to roam based on the determined roaming characteristic of the client device, the first access point is to:
 determine a previous roaming behavior of the client device; and
 determine that the previous roaming behavior of the client device occurred based on the determined roaming characteristic of the client device.

* * * * *